(12) United States Patent
Katayama (10) Patent No.: US 7,198,334 B2
(45) Date of Patent: Apr. 3, 2007

(54) BRAKE FLUID CONTROL DEVICE (75) Inventor: Yoshitada Katayama, Kariya (JP)

(73) Assignee: Advics Co., Ltd., Aichi-pref. (JP)

( * ) Notice: Subject to any disclaimer, the term of this patent is extended or adjusted under 35 U.S.C. 154(b) by 0 days.

(21) Appl. No.: 10/947,140

(22) Filed: Sep. 23, 2004

(65) Prior Publication Data
US 2005/0073194 A1 Apr. 7, 2005

(30) Foreign Application Priority Data
Oct. 6, 2003 (JP) ............................. 2003-347105
Sep. 1, 2004 (JP) ............................. 2004-254253

(51) Int. Cl.
B60T 8/36 (2006.01)
(52) U.S. Cl. ............................. 303/119.2; 251/129.02; 251/129.15
(58) Field of Classification Search ............. 303/119.2, 303/119.3; 251/129.02, 129.15
See application file for complete search history.

(56) References Cited

U.S. PATENT DOCUMENTS

| 5,542,755 | A | * | 8/1996 | Staib et al. | ............... 303/119.2 |
| 5,718,489 | A | | 2/1998 | Megerle et al. | |
| 6,427,972 | B1 | * | 8/2002 | Kirschner | ............... 251/129.15 |
| 6,637,724 | B1 | * | 10/2003 | Mayer | ............... 251/129.15 |

* cited by examiner

Primary Examiner—Devon Kramer
(74) Attorney, Agent, or Firm—Posz Law Group, PLC (57) ABSTRACT An engagement portion with a shape recessed in a radial direction of a sleeve is formed on an outer peripheral surface of the sleeve so as to circuit the outer periphery of the sleeve. The engagement portion is also disposed inside an assembly hole of a housing. Caulking of an area surrounding an opening of the assembly hole joins the engagement portion and a deformed portion of the housing. Parts such as sealing members and bushings become unnecessary, because the assembly hole and the sleeve are sealed by contacting surfaces of the deformed portion and the engagement portion. Furthermore, fixing of the sleeve and the housing, as well as the formation of a sealed portion between the assembly hole and the sleeve assures the realization of a one-time caulking process.

6 Claims, 7 Drawing Sheets

BRAKE FLUID CONTROL DEVICE

CROSS REFERENCE TO RELATED APPLICATION

This application is based upon and claims the benefit of Japanese Patent Application No. 2003-340175 filed on Oct. 6, 2003 and Japanese Patent Application No. 2004-254253 filed on Sep. 1, 2004, the content of which are incorporated herein by reference.

FIELD OF THE INVENTION

The present invention relates to a brake fluid control device, which opens and closes a fluid passage using an electromagnetic valve; and is suitable for application to, for example, an ABS actuator of an ABS (anti-lock brake system), in which a locking tendency of a wheel is avoided by increasing or decreasing a brake hydraulic pressure in a vehicle.

BACKGROUND OF THE INVENTION

Figure 7:
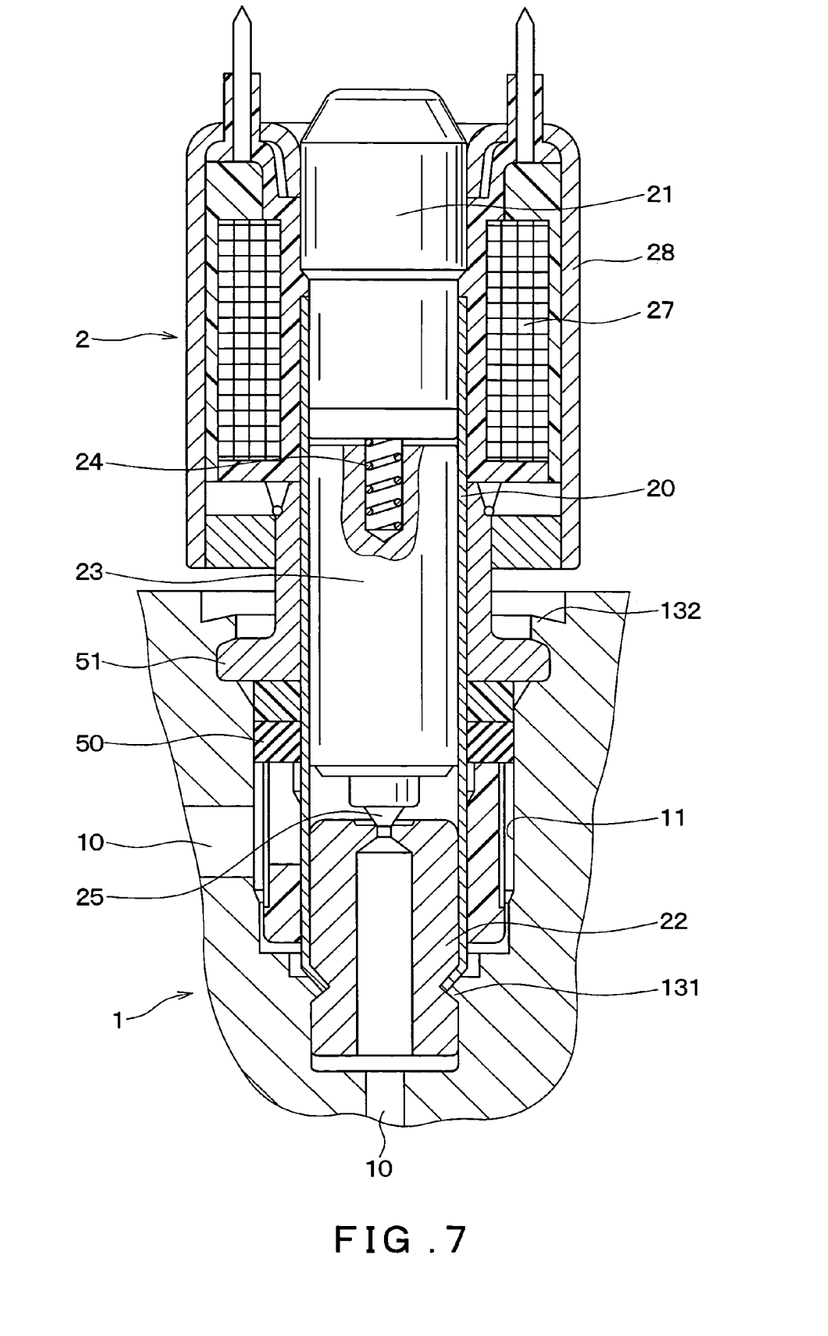
FIG. 7 is a cross-sectional view of a conventional ABS actuator.

A conventional ABS actuator such as shown in FIG. 7 is designed so that a fluid passage 10 through which brake fluid flows is formed in a housing 1, and the fluid passage 10 is opened and closed by an electromagnetic valve 2.

After accommodation by an assembly hole 11 formed on the housing 1, a sleeve 20 and a valve seat 22 of the electromagnetic valve 2 are fixed to the housing 1 by caulking a first caulking portion 131 of the housing 1. A seal member 50 and a bushing 51 are then installed between the assembly hole 11 and the sleeve 20. Thereafter, sealing between the assembly hole 11 and the sleeve 20 is performed by caulking a second caulking portion 132 on the periphery of an opening of the assembly hole 11 (refer to the published Japanese translation of PCT application No. 9-504247 originally filed in English for an example).

However, in the device described in the example above, the sleeve 20 of the electromagnetic valve 2 is fixed to the housing 1, and the seal member 50 is installed between the sleeve 20 of the electromagnetic valve 2 and the assembly hole 11 of the housing 1. Therefore, caulking must be performed twice. Furthermore, numerous parts such as the seal member 50 and the bushing 51 are used for sealing between the assembly hole 11 and the sleeve 20. An increase in the number of caulking processes and parts in such a manner can lead to a problem of higher costs.

SUMMARY OF THE INVENTION

In view of the foregoing considerations, it is an object of the present invention to reduce the number of caulking processes and parts, and to achieve lower costs for a brake fluid control device that opens and closes a fluid passage using an electromagnetic valve.

To achieve the above object, according to a first aspect of the invention, a brake fluid control device has a housing and an electromagnetic valve. The housing includes a fluid passage through which brake fluid flows, and an assembly hole in which an opening at one end opens to outside the housing, and another end communicates to the fluid passage. The electromagnetic valve includes a sleeve with a cylindrical shape where one end is received in the assembly hole, a coil disposed on an outer periphery of another end of the sleeve, and a plunger accommodated inside the sleeve, which opens and closes the fluid passage depending on electric current running through the coil. Furthermore, an engagement portion has a shape recessed or protruding in a radial direction of the sleeve, and is formed on an outer peripheral surface of the sleeve so as to circuit an outer periphery of the sleeve. The engagement portion is disposed inside the assembly hole, and the housing and the engagement portion are joined by caulking an area surrounding an opening of the assembly hole.

Consequently, parts such as sealing members and bushings become unnecessary, because the assembly hole and the sleeve are sealed by contacting surfaces of the housing and the engagement portion. Furthermore, fixing of the sleeve and the housing, as well as the formation of a sealed portion between the assembly hole and the sleeve assures the realization of a one-time caulking process. The number of caulking processes and parts is thus reduced, resulting in lower costs.

According to a second aspect of the invention, the plunger further includes a major diameter portion that slides with respect to the sleeve, and a minor diameter portion extending toward a side of the fluid passage from the major diameter portion. In addition, the engagement portion is a recessed shape and positioned on an outer side of the minor diameter portion.

Consequently, the engagement portion is disposed using dead space on the outer side of the minor diameter portion, thus assuring a compact brake fluid control device.

According to a third aspect of the invention, the engagement portion is a shape protruding toward the outer periphery of the sleeve. In addition, a maximum outer diameter of the engagement portion is positioned farther inside in the radial direction of the sleeve than a caulking groove provided in the housing.

Therefore, it is possible to prevent a force stronger than necessary from operating on the engagement portion of the sleeve upon plastic deformation of the housing. Deformation of the engagement portion of the sleeve is thus suppressed, while assuring a seal between the housing and the engagement portion of the sleeve.

According to a fourth aspect of the invention, the engagement portion has a surface inclined with respect to a reference plane, when the reference plane is set as a surface perpendicular to a direction in which a caulking load operates.

Therefore, spring back of a deformed portion of the housing plastically deformed by caulking is reduced at the time of caulking load removal. Consequently, the surface pressure of a contacting surface of the engagement portion and the deformed portion of the housing is maintained, thus ensuring excellent sealability.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

The present invention will be described further with reference to various embodiments in the drawings.

First Embodiment

Figure 1:
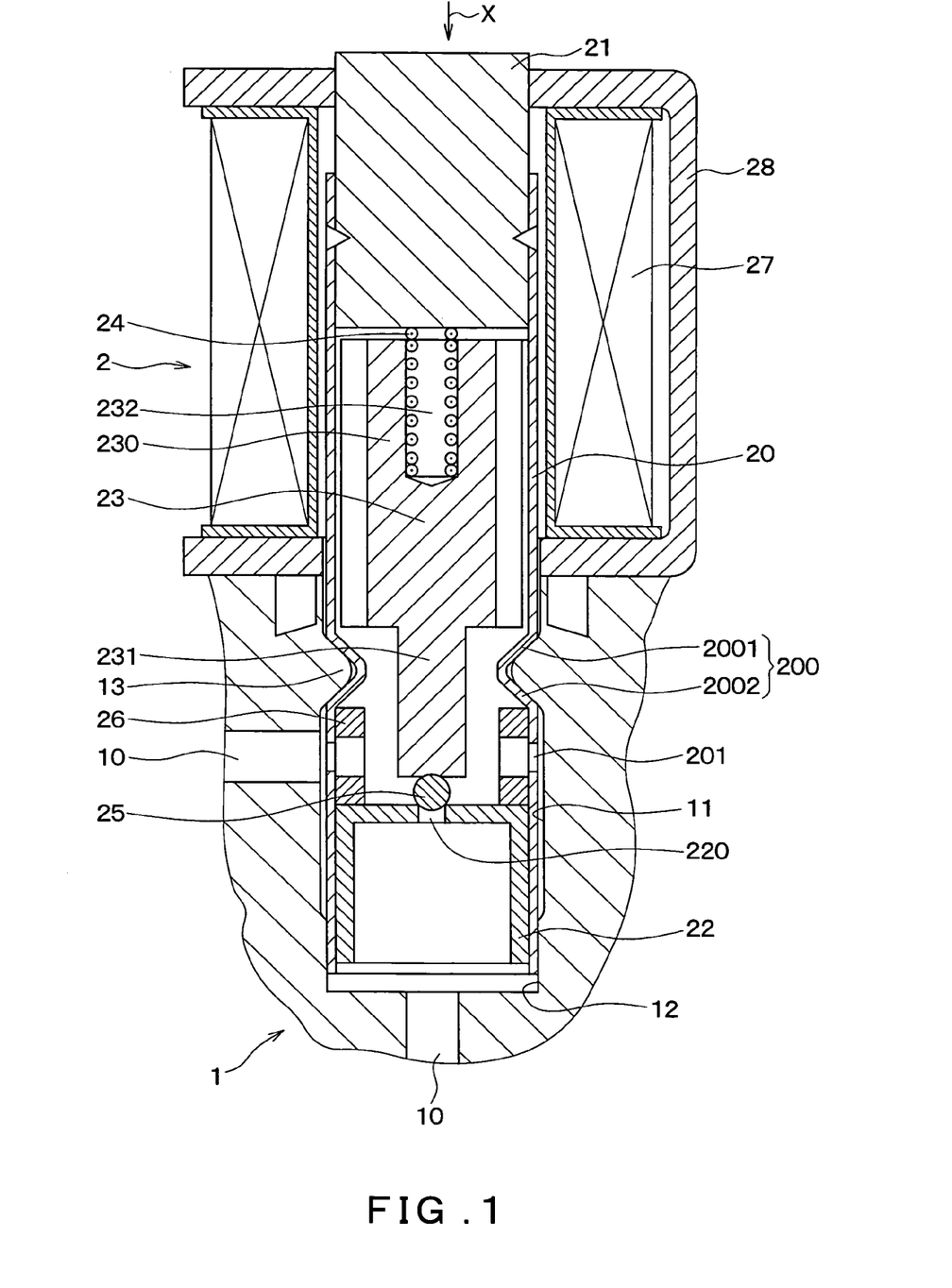
FIG. 1 is a cross-sectional view showing a brake fluid control device according to a first embodiment of the present invention.
Figure 2:
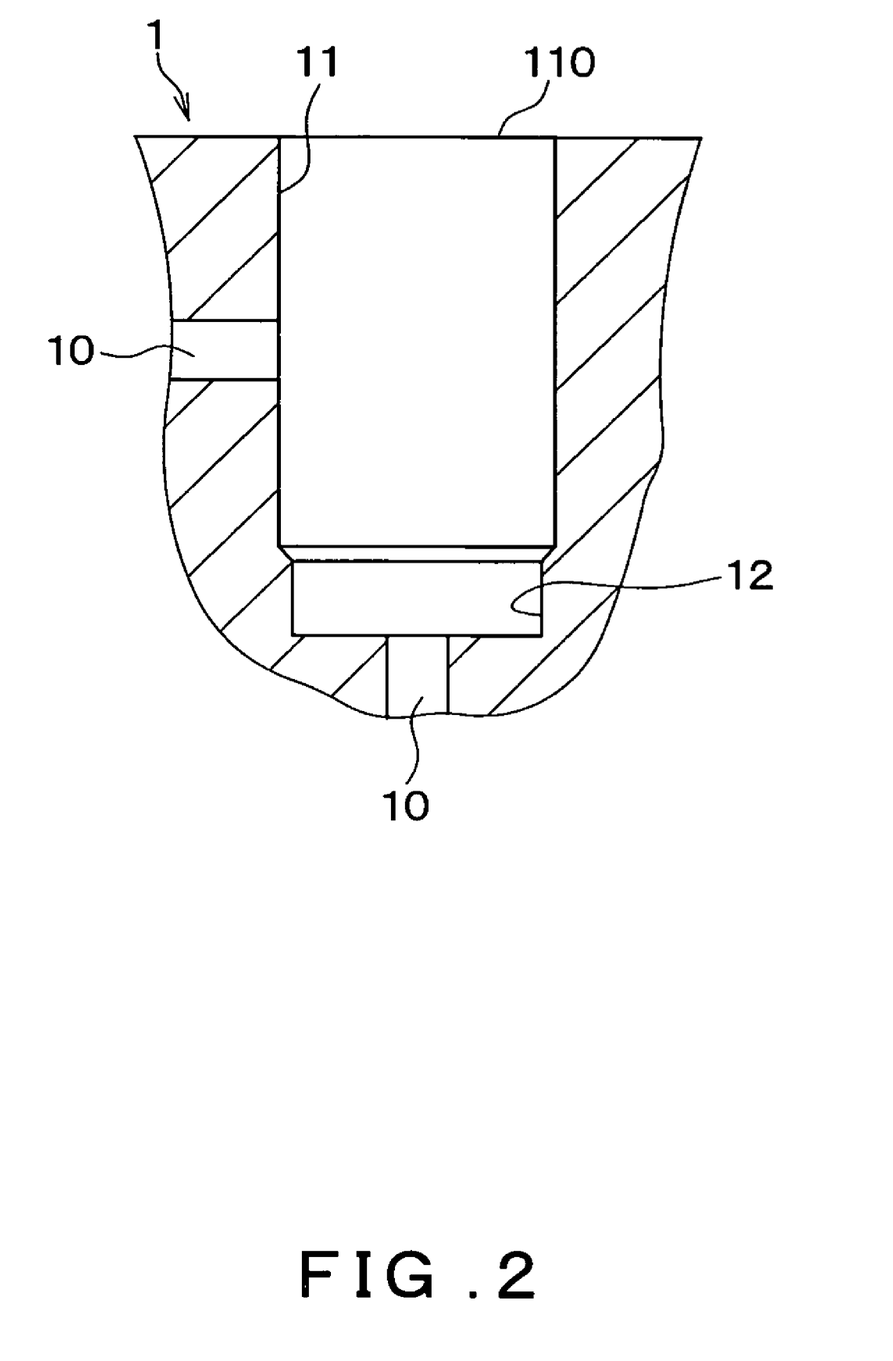
FIG. 2 is a cross-sectional view showing a housing 1 before caulking.

A brake fluid control device according to a first embodiment of the present invention will be described with reference to the accompanying drawings. FIG. 1 is a cross-sectional view showing the brake fluid control device according to the first embodiment; and FIG. 2 is a cross-sectional view showing a housing 1 before caulking.

As shown in FIG. 1, an ABS actuator corresponding to the brake fluid control device is provided with the housing 1 and an electromagnetic valve 2. The housing 1 is formed from metal such as aluminum, and as shown in FIGS. 1 and 2, a cylindrical assembly hole 11 is formed in which a sleeve 20 (described in detail later) of the electromagnetic valve 2 is received. The assembly hole 11 communicates with a fluid passage 10, and an opening 110 at one end opens to outside the housing 1. A press-fit hole 12 with a diameter smaller than the assembly hole 11 is formed at a bottom portion of the assembly hole 11, and the sleeve 20 of the electromagnetic valve 2 is press fit therein.

The electromagnetic valve 2, as shown in FIG. 1, is provided with the cylindrical sleeve 20, which is received in the assembly hole 11. The sleeve 20 is made of press molded nonmagnetic material such as stainless steel; and an engagement portion 200 with a shape recessed in the radial direction of the sleeve 20 is formed on an outer peripheral surface thereof so as to circuit the outer periphery of the sleeve 20. In addition, the engagement portion 200 has two surfaces 2001 and 2002. These two surfaces 2001 and 2002 are inclined with respect to a reference plane, when it is set as a plane perpendicular to an operation direction X of a caulking load (described in detail later). Furthermore, a plurality of communication holes 201 for communication to the fluid passage 10 of the housing 1 are formed in the sleeve 20.

A cylindrical stator core 21 formed from magnetic metal is disposed on an inner portion of one end of the sleeve 20. The sleeve 20 and the stator core 21 are joined fluid-tight by laser welding or the like, thereby blocking an end of the sleeve 20.

A metal valve seat 22 press molded into a cylindrical shape closed at one end is fixed to an inner portion of the other end of the sleeve 20. On the valve seat 22, a valve seat hole 220 for communication to the fluid passage 10 of the housing 1 is formed, and configured so as to open and close by a valve body to be described later.

Inside the sleeve 20, a stepped and cylindrical plunger 23 formed from magnetic metal is reciprocably accommodated. The plunger 23 has a major diameter portion 230 that slides and contacts the sleeve 20, and a minor diameter portion 231 with a diameter smaller than that of the major diameter portion 230, which extends toward a side of the valve seat 22 from the major diameter portion 230.

In the major diameter portion 230, a spring insertion hole 232 is formed on a side of the stator core 21, and a spring 24 that biases the plunger 23 toward the side of the valve seat 22 is inserted in the spring insertion hole 232. In addition, a spherical valve body 25 is fixed to an end of the minor diameter portion 231 by caulking or welding. To open and close the valve seat hole 220, the spherical valve body 25 contacts and separates from the valve seat of the valve seat hole 220 in the valve seat 22. Furthermore, the engagement portion 200 of the sleeve 20 is also disposed on an outer side of the minor diameter portion 231.

A filter 26 is disposed inside the sleeve 20 at a position opposite the communication hole 201. Foreign matter mixed in the brake fluid is prevented from entering the electromagnetic valve 2 by the filter 26.

In order to form a magnetic field when there is an electric current, a coil 27 is disposed on an outer periphery of a region in the sleeve 20 protruding from the housing 1. In addition, a yoke 28 made of magnetic metal is provided so as to surround the coil 27.

The sleeve 20, stator core 21, valve seat 22, plunger 23, spring 24, valve body 25, and filter 26 are fixedly provided to form a valve portion. After mounting the valve portion on the housing 1, the coil 27 and the yoke 28 are then attached to the sleeve 20.

An operation of the electromagnetic valve 2 with the above configuration will be described next. FIG. 1 shows a state in which electric current is not supplying through the coil. In this state, the plunger 23 is biased toward the side of the sleeve 22 by the elastic force of the spring 24. Consequently, the valve body 25 sits on the valve seat of the valve seat hole 220 to close the valve seat hole 220. The fluid passage 10 is thus blocked, preventing the flow of brake fluid.

On the other hand, when there is electric current supplying through the coil 27, the coil 27 forms a magnetic field, and a magnetic path is formed by the stator core 21, the plunger 23, and the yoke 28. The plunger is then pulled to a side of the stator core 21 by magnetic attraction, resisting the elastic force of the spring 24. The valve body 25 separates from the valve seat of the valve seat hole 220 to open the valve seat hole 220, thereby setting the fluid passage 10 to a communication state to allow the flow of brake fluid.

Next, fixing of the valve portion and the housing 1, and more specifically, fixing of the sleeve 20 and the housing 1 will be described. The sleeve 20 is first received by the assembly hole 11, and a tip of the sleeve 20 is further press fit into the press-fit hole 12. In such a state with the sleeve 20 accommodated at a position where it is press fit into the press-fit hole 12, the engagement portion 200 is positioned between the opening 110 and the fluid passage 10 near the opening 110 in the assembly hole 11.

An area surrounding the opening 110 is then caulked in the housing 1. It should be noted that a reference numeral X in the drawing illustrates an operation direction of the caulking load. In this example, the load operation direction X is parallel to an axis line of the sleeve 20. By caulking the area surrounding the opening 110, the housing 1 undergoes plastic deformation. A deformed portion 13 thereof enters the interior of the engagement portion 200 of the sleeve 20, thereby fixing the sleeve 20 and the housing 1. In addition, a space between the assembly hole 11 and the sleeve 20 is sealed by contacting surfaces of the deformed portion 13 and the engagement portion 200.

Thus according to the present embodiment, parts such as sealing members and bushings become unnecessary, because the assembly hole 11 and the sleeve 20 are sealed by contacting surfaces of the deformed portion 13 of the housing 1 and the engagement portion 200 of the sleeve 20. Furthermore, fixing of the sleeve 20 and the housing 1, as well as the formation of a sealed portion between the assembly hole 11 and the sleeve 20 assures the realization of a one-time caulking process. The number of caulking processes and parts is thus reduced, resulting in lower costs.

Moreover, in the present embodiment, the engagement portion 200 has two surfaces 2001 and 2002 inclined with respect to the reference plane, when it is set as a plane perpendicular to the load operation direction X. In this case, spring back of the deformed portion 13 of the housing 1 plastically deformed by caulking is reduced at the time of caulking load removal. Consequently, the surface pressure of the contacting surface of the engagement portion 200 and the deformed portion 13 is maintained, thus ensuring excellent sealability.

In the present embodiment, the engagement portion 200 of the sleeve 20 is disposed using dead space on the outer side of the minor diameter portion 231 of the plunger 23, thus assuring a compact ABS actuator.

Although an engagement portion (recessed portion) in a conventional ABS actuator is formed on a valve seat by cutting, the engagement portion 200 of the sleeve 20 in the present embodiment can be easily and inexpensively formed by press molding.

Second Embodiment

Figure 3:
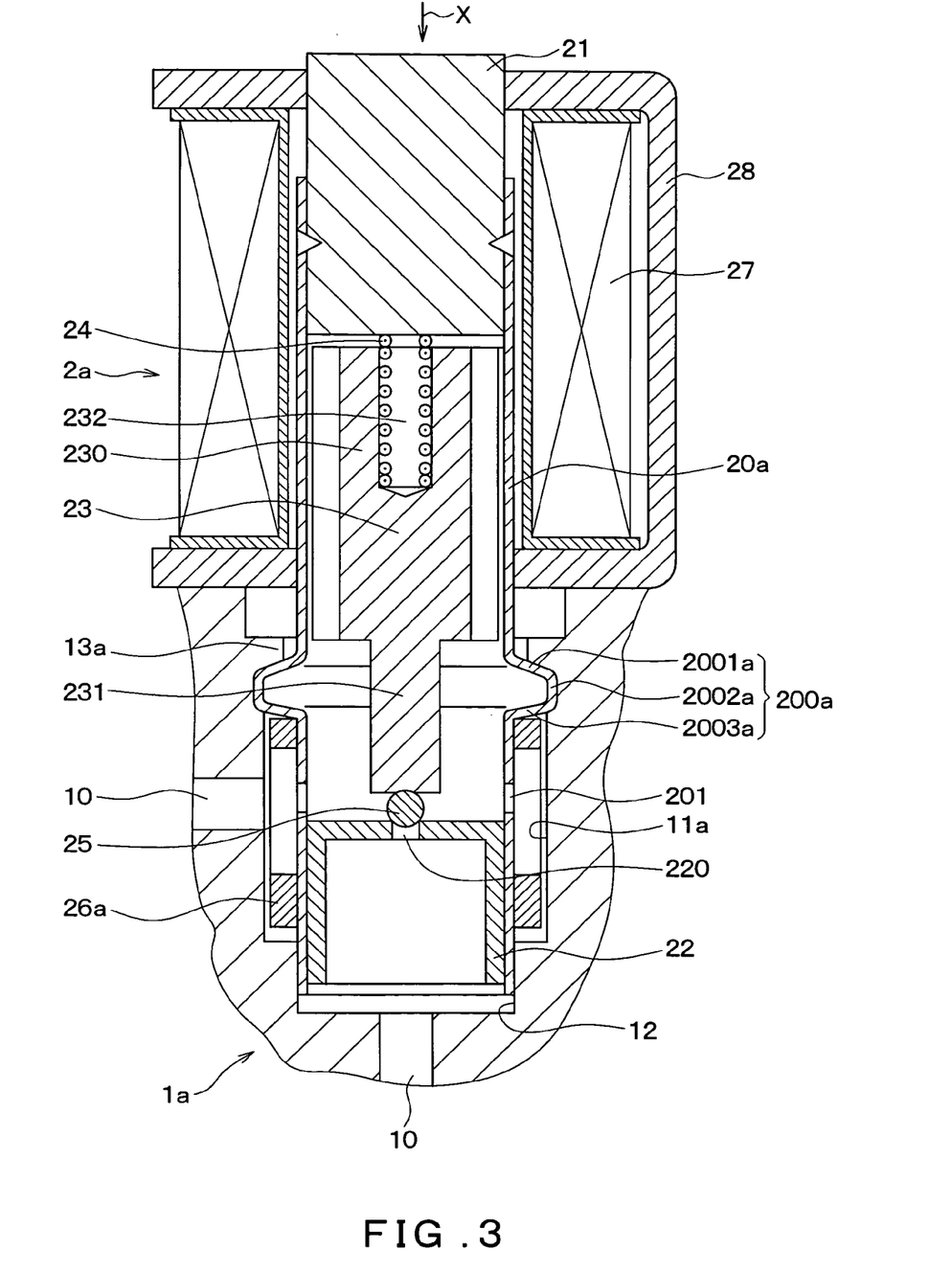
FIG. 3 is a cross-sectional view showing a brake fluid control device according to a second embodiment of the present invention.
Figure 4:
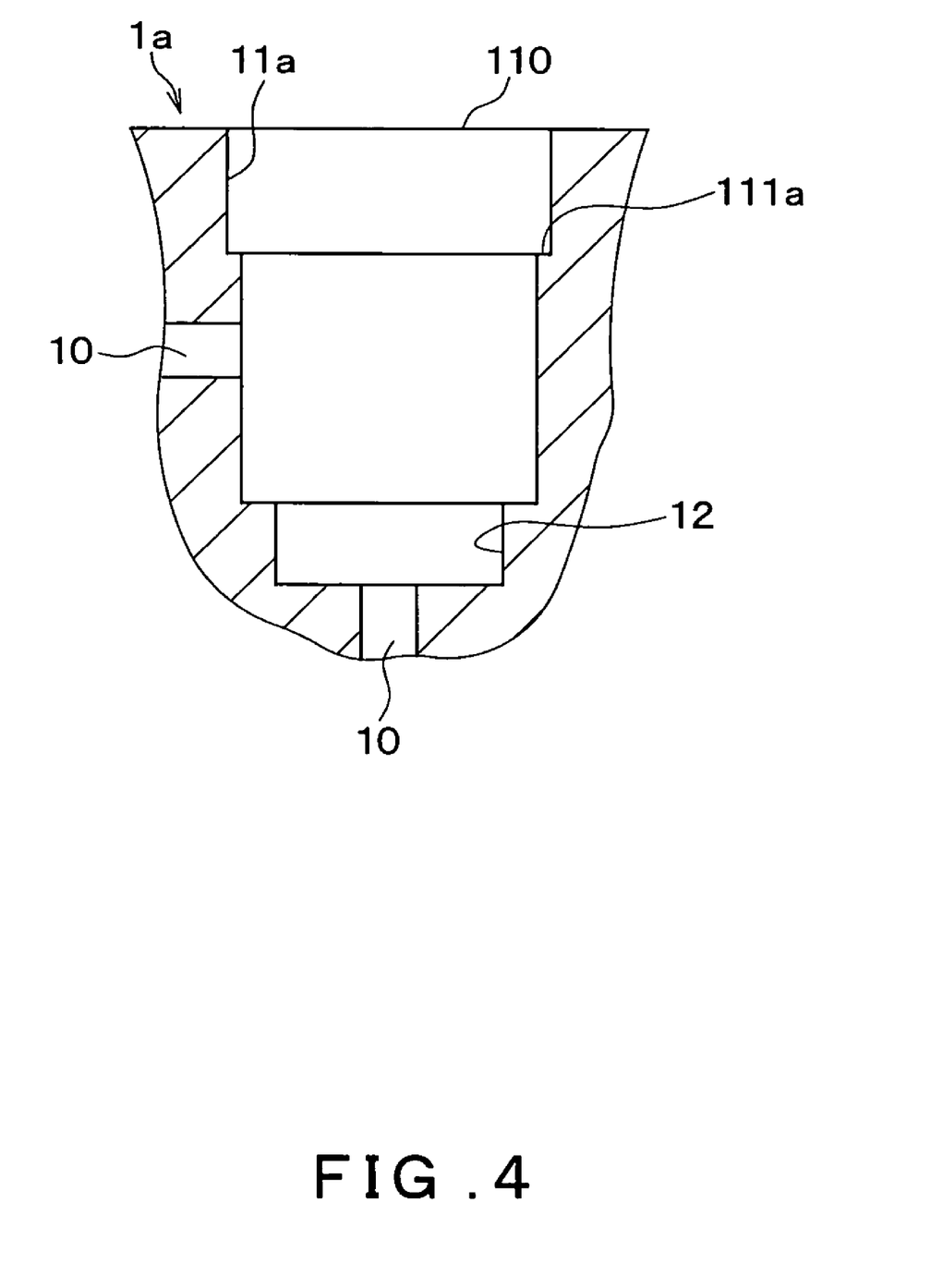
FIG. 4 is a cross-sectional view showing a housing 1a before caulking.

FIG. 3 is a cross-sectional view showing a brake fluid control device according to a second embodiment of the present invention; and FIG. 4 is a cross-sectional view showing a housing 1a before caulking. The present embodiment differs from the first embodiment in the structure near the assembly hole in the housing 1a, the structure of a sleeve 20a of an electromagnetic valve 2a, and the placement of a filter 26a. Note that like symbols are used for portions equivalent or identical to the first embodiment, the descriptions of which are omitted.

An assembly hole 11a of the housing 1a, as shown in FIG. 4, which accommodates the sleeve 20a of the electromagnetic valve 2a, has a stepped shape formed with a step 111a.

As shown in FIG. 3, an engagement portion 200a, with a shape protruding in a radial direction of the sleeve 20a, is formed on an outer peripheral surface of the sleeve 20a so as to circuit the outer periphery of the sleeve 20a. The engagement portion 200a has three surfaces 2001a, 2002a, and 2003a. When a reference plane is set as a plane perpendicular to the operation direction X of the caulking load, the surface 2001a is inclined with respect to the reference plane; the surface 2002a is perpendicular to the reference plane; and the surface 2003a is parallel to the reference plane. Furthermore, the filter 26a is disposed on an outer side of the sleeve 20a.

Fixing of the sleeve 20a and the housing 1a is performed in the following manner. The sleeve 20a is received in the assembly hole 11a up to a position where the surface 2003a parallel to the reference plane contacts the step 111a, after which a tip of the sleeve 20a is press fit into the press-fit hole 12.

Next, the housing 1a undergoes plastic deformation after caulking the area surrounding the opening 110 of the housing 1a. A deformed portion 13a thereof covers the surface 2001a inclined with respect to the reference plane in the engagement portion 200a, thereby fixing the sleeve 20a and the housing 1a. In addition, a space between the assembly hole 11a and the sleeve 20a is sealed by contacting surfaces of the deformed portion 13a and the engagement portion 200a.

The present embodiment can also ensure an effect identical to the first embodiment.

Third Embodiment

Figure 5:
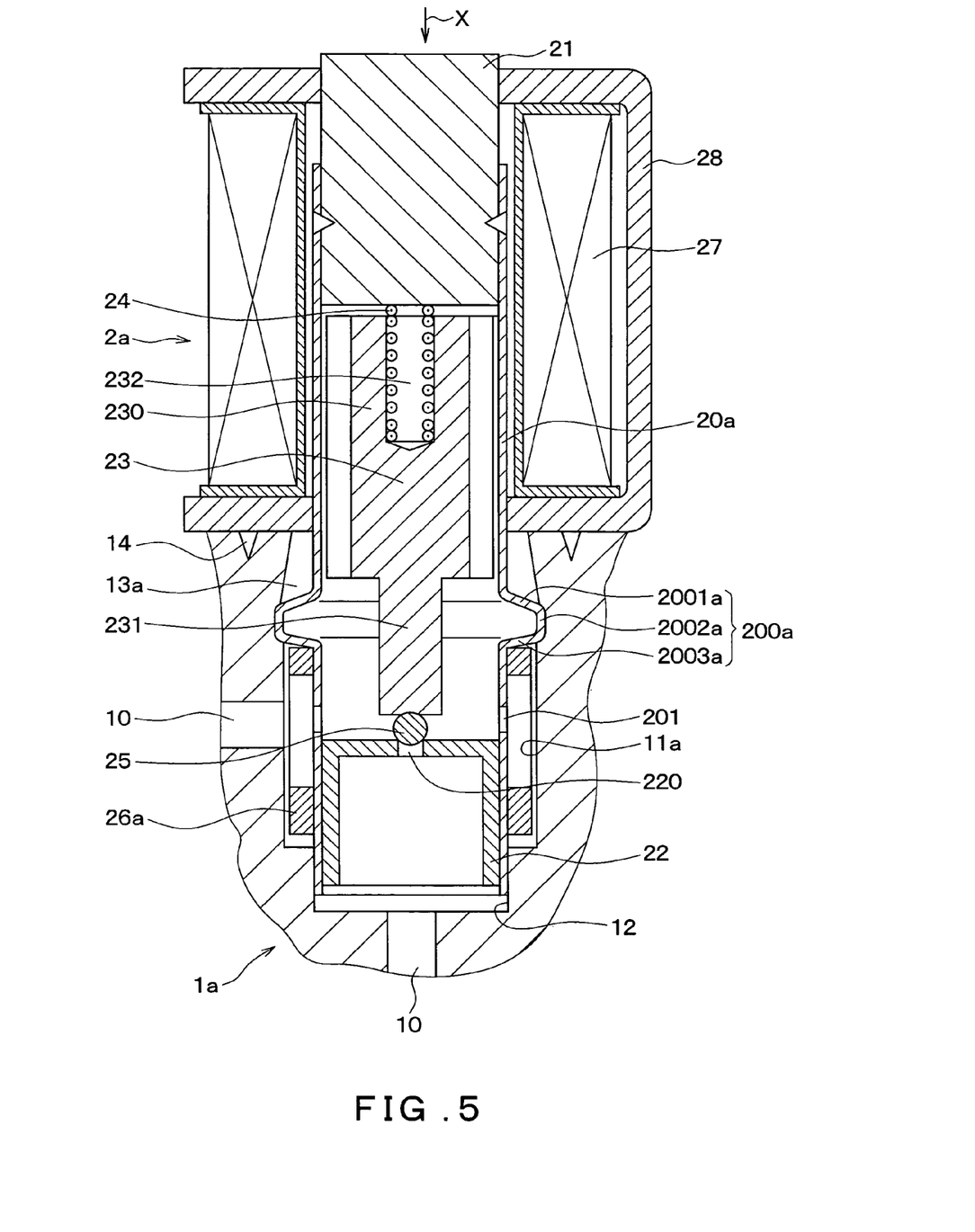
FIG. 5 is a cross-sectional view showing a brake fluid control device according to a third embodiment of the present invention.
Figure 6A:
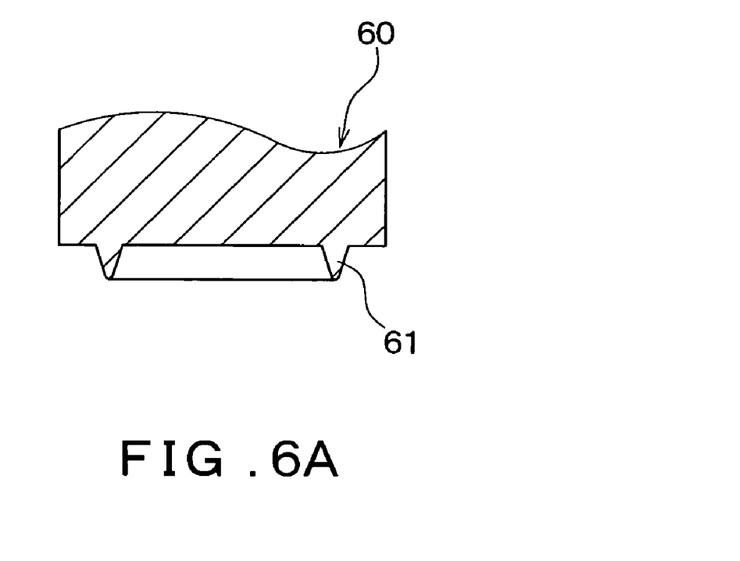
FIG. 6A is a front cross-sectional view of a punch used in a caulking process.

FIG. 5 is a cross-sectional view showing a brake fluid control device according to a third embodiment of the present invention. FIG. 6A is a front cross-sectional view of a punch used in a caulking process, and FIG. 6B is a bottom view of FIG. 6A.

In order to caulk an area surrounding the opening 110 of the housing 1a, a portion of the housing 1a is plastically deformed by operating a punch in the direction X. Also, in cases where the engagement portion 200a of the sleeve 20a protrudes in the radial direction such as in the above second embodiment, it is preferable for the punch not to operate on the engagement portion 200a of the sleeve 20a in the direction X with a force stronger than necessary.

Figure 6B:
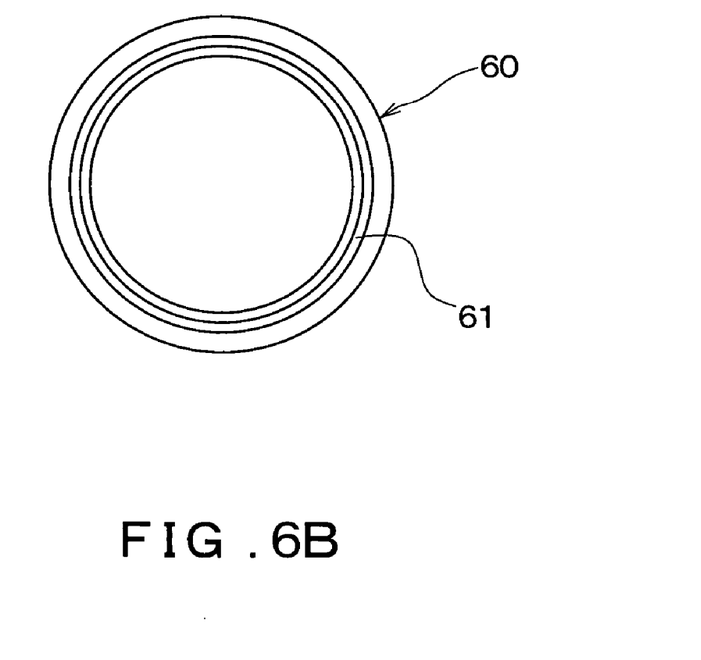
FIG. 6B is a bottom view of FIG. 6A.

As shown in FIG. 6, a punch 60 used in the present embodiment has convex portions 61 that are arranged in a circle and whose sectional profile is a wedge shape. The diameter of the convex portion 61 is set larger than a maximum outer diameter of the engagement portion 200a of the sleeve 20a.

As shown in FIG. 5, the maximum outer diameter of the engagement portion 200a of the sleeve 20a is positioned farther inside in the radial direction of the sleeve 20a than a portion (a caulking groove 14 created on the housing 1a) on which the convex portions 61 of the punch 60 operate on the housing 1a.

Using such a configuration, it is possible to prevent a force stronger than necessary from operating on the engagement portion 200a of the sleeve 20a upon plastic deformation of the housing 1a. Deformation of the engagement portion 200a of the sleeve 20a is thus suppressed, while assuring a seal between the housing 1a and the engagement portion 200a of the sleeve 20a.

OTHER EMBODIMENTS

Besides an ABS actuator, the present invention can also be applied to other brake fluid control devices.

While the above description is of the preferred embodiments of the present invention, it should be appreciated that the invention may be modified, altered, or varied without deviating from the scope and fair meaning of the following claims.

What is claimed is:

1. A brake fluid control device comprising:
 a housing including
  a fluid passage through which brake fluid flows, and
  an assembly hole in which an opening at one end opens to outside the housing, and another end communicates to the fluid passage; and
 an electromagnetic valve including
  a sleeve with a cylindrical shape where one end is received in the assembly hole,
  a coil disposed on an outer periphery of another end of the sleeve, and
  a plunger accommodated inside the sleeve, which opens and closes the fluid passage by sliding in the sleeve depending on electric current running through the coil, the brake fluid control device wherein the sleeve has an engagement portion that has a shape recessed in a radial direction of the sleeve, is formed so as to encircle an outer periphery of the sleeve, is disposed inside the assembly hole, a filter is disposed inside the sleeve, and the engagement portion is joined and placed in contact with the housing by caulking an area surrounding an opening of the assembly hole opened on the outside of the housing.

2. The brake fluid control device according to claim 1, wherein the plunger further includes a major diameter portion that slides with respect to the sleeve, and a minor diameter portion extending toward a side of the fluid passage from the major diameter portion, and the engagement portion is a recessed shape and positioned on an outer side of the minor diameter portion.

3. The brake fluid control device according to claim 1, wherein the engagement portion is a shape protruding toward the outer periphery of the sleeve, and a maximum outer diameter of the engagement portion is positioned farther inside in the radial direction of the sleeve than a caulking groove provided in the housing.

4. The brake fluid control device according to claim 1, wherein the engagement portion has a surface inclined with respect to a reference plane, when the reference plane is set as a surface perpendicular to a direction in which a caulking load operates.

5. The brake fluid control device according to claim 2, wherein the engagement portion has a surface inclined with respect to a reference plane, when the reference plane is set as a surface perpendicular to a direction in which a caulking load operates.

6. The brake fluid control device according to claim 3, wherein the engagement portion has a surface inclined with respect to a reference plane, when the reference plane is set as a surface perpendicular to a direction in which a caulking load operates.

* * * * *